(12) United States Patent
Yaung

(10) Patent No.: US 8,473,933 B2
(45) Date of Patent: Jun. 25, 2013

(54) REFACTORING CALL SITES

(75) Inventor: Theodore Yaung, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 12/778,140

(22) Filed: May 12, 2010

(65) Prior Publication Data

US 2011/0283258 A1 Nov. 17, 2011

(51) Int. Cl.
*G06F 9/45* (2006.01)

(52) U.S. Cl.
USPC ............ 717/143; 717/108; 717/149; 717/155

(58) Field of Classification Search
None
See application file for complete search history.

(56) References Cited

U.S. PATENT DOCUMENTS

| | | | | |
|---|---|---|---|---|
| 5,857,105 A * | 1/1999 | Ayers et al. | | 717/144 |
| 6,009,273 A * | 12/1999 | Ayers et al. | | 717/143 |
| 6,014,517 A * | 1/2000 | Shagam et al. | | 717/142 |
| 7,370,318 B1 * | 5/2008 | Howe et al. | | 717/110 |
| 7,526,755 B2 * | 4/2009 | DeLine et al. | | 717/126 |
| 2002/0174418 A1 * | 11/2002 | Ruf | | 717/155 |
| 2007/0234288 A1 | 10/2007 | Lindsey et al. | | |
| 2007/0234289 A1 * | 10/2007 | Naroff et al. | | 717/120 |
| 2008/0034359 A1 * | 2/2008 | Duffy et al. | | 717/152 |
| 2008/0052684 A1 | 2/2008 | Bowdidge et al. | | |
| 2008/0222616 A1 * | 9/2008 | Cheng et al. | | 717/137 |
| 2008/0301656 A1 * | 12/2008 | Archambault et al. | | 717/157 |
| 2009/0328002 A1 * | 12/2009 | Lin et al. | | 717/120 |
| 2010/0198799 A1 * | 8/2010 | Krishnan et al. | | 707/702 |
| 2010/0299658 A1 * | 11/2010 | Ng et al. | | 717/140 |

OTHER PUBLICATIONS

Lukas Rytz, "Named and default arguments for polymorphic object-oriented languages", pp. 5-6, Mar. 22-26, 2010.*
Fowler, Martin., "Code Refactorings", Retreived at << http://www.jetbrains.com/resharper/features/code_refactoring.html>>, Retrieved Date: Feb. 26, 2010, pp. 8.
Smet, Bart D., "C# 4.0 Feature Focus—Part 2—Named Parameters", Retreived at << http://dotnet.dzone.com/news/c-40-feature-focus-part-2-name >>, Nov. 11, 2008, pp. 3.
Deva, Prashant., "Explore Refactoring Functions in Eclipse JDT", Retreived at << http://www.ibm.com/developerworks/opensource/library/os-eclipse-refactoring/index.html >>, Nov. 24, 2009, pp. 11.
"Named and Optional Arguments (C# Programming Guide)", Retrieved at << http://msdn.microsoft.com/en-us/library/dd264739(VS.100).aspx >>, Retrieved Date: Feb. 26, 2010, pp. 5.
Lowy, Juval., "C# 2.0 Code Refactoring", Retrieved at << http://www.code-magazine.com/articleprint.aspx?quickid=0401071&printmode=true >>, Retrieved Date: Feb. 26, 2010, pp. 13.

* cited by examiner

*Primary Examiner* — Issac Tecklu

(57) ABSTRACT

A system and method for refactoring one or more call sites based on a revised signature. If the original call site is ordered, the refactored call site is generated by sorting the arguments based on the revised signature. Each unnamed argument is selectively changed to a named argument based on whether it is preceded by a named argument and whether its index value matches the index value of its corresponding parameter in the revised signature. If the original call site is unordered, the arguments preceding the first named argument are ordered. New arguments corresponding to new parameters are added and selectively made to be named arguments. New optional arguments may be included or omitted from the refactored call site.

20 Claims, 9 Drawing Sheets

REFACTORING CALL SITES

BACKGROUND

Many programming languages provide mechanisms in which one or more arguments in a function call can be associated with corresponding parameters in a function definition by matching each argument position in an argument list with the corresponding parameter position in a parameter list. The Visual C#® programming language, by Microsoft Corporation, includes a "named argument" feature that enables an association between an argument and a parameter to be specified by associating the argument with the parameter's name rather than with the parameter's position in the parameter list. This allows arguments to be listed in an order other than the corresponding parameter list order.

Visual C# also includes an optional argument feature, in which a function can specify that one or more parameters are optional. A default value for each optional parameter is specified. A call site may omit an argument for any optional parameter. The compiler recognizes omitted optional arguments, and inserts the specified default value.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to refactor call sites corresponding to a signature when the signature changes. The call sites may include named arguments. The call sites may omit one or more optional arguments. In one embodiment, ordered call sites are refactored by sorting the arguments to match the parameter list of the revised signature. In one embodiment, each unnamed argument that is preceded by a named argument is modified to be a named argument. Unnamed arguments for which the argument index does not match the index of its corresponding parameter in the revised signature may be modified to be a named argument.

In one embodiment, unordered argument lists may be refactored by sorting the unnamed arguments that are before the first named argument, based on the ordering of the revised parameter list. In one embodiment, each unnamed argument that is preceded by a named argument is modified to be a named argument. Each unnamed argument for which the argument index does not match the index of its corresponding parameter in the revised signature may be modified to be a named argument.

In one embodiment, new arguments corresponding to new parameters may be added to the refactored argument list. If the argument list is ordered, new arguments may be positioned so that the argument list remains ordered. If the argument list is unordered, new arguments may be appended to the end of the argument list.

In one embodiment, newly added arguments corresponding to newly added optional parameters may be added or omitted from the refactored argument list. If added, they may use the default value specified for the corresponding parameter. If omitted, unnamed arguments that follow them in the refactored argument list may be modified to be named arguments.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
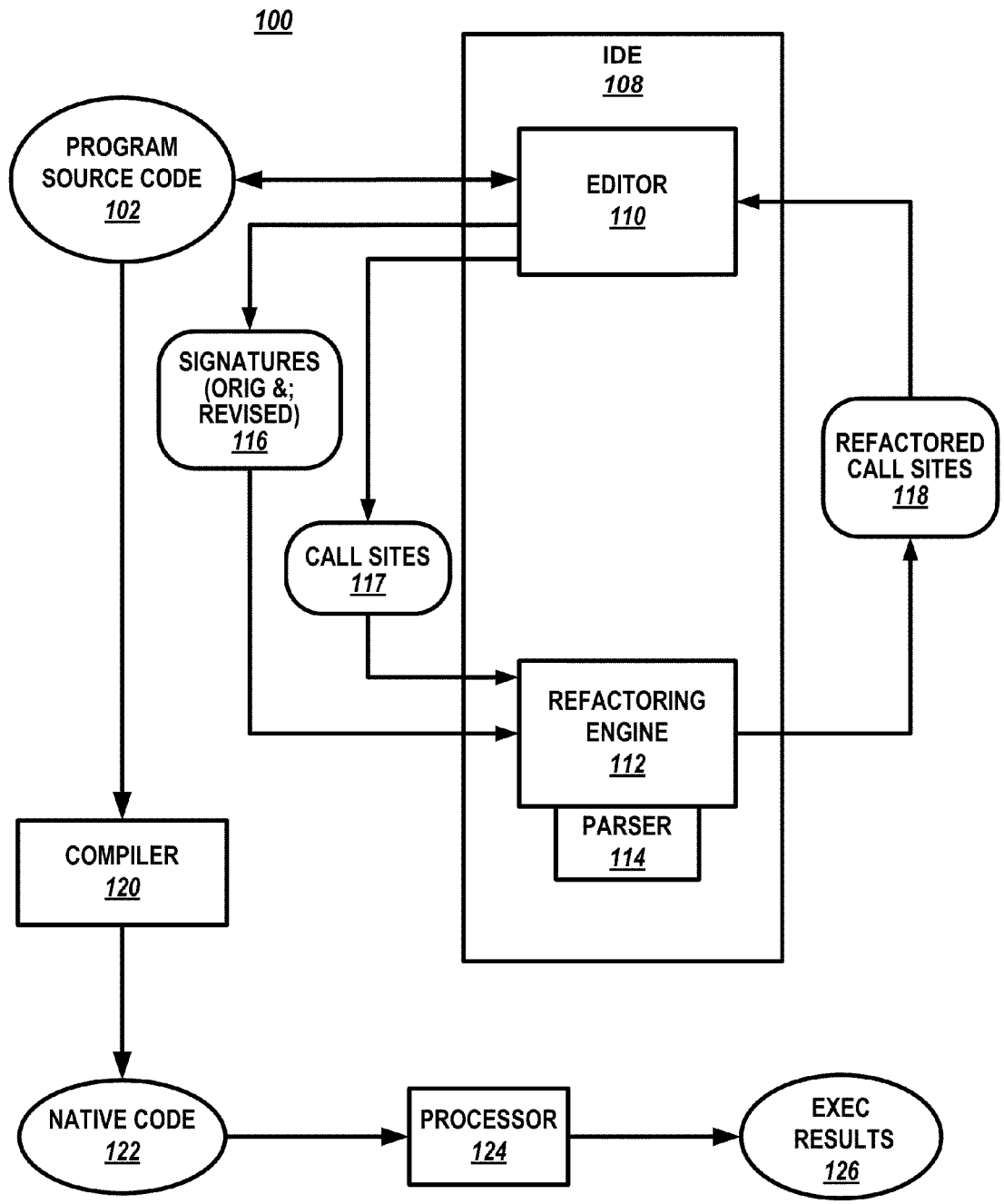
FIG. 1 is a block diagram of a computer system in which mechanisms described herein may be implemented.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, unless otherwise indicated by the context, the term "function" refers to a portion of code within a larger program that performs a specific task, and can execute relatively independent of other portions of the program. A function may, but does not necessarily, return a value. In various computer languages, different terms may be used, such as subroutine, method, procedure, or subprogram. As used herein, the term "function" may include all of these. The term "function" may include other types of code entities that specify parameters and accept arguments. For example, the C# language includes indexers that allow instances of a class to be indexed in a manner similar to arrays.

As used herein, the term "parameter" refers to a program variable used in a function to refer to data provided as input to the function. A function "signature" includes a parameter list that specifies zero or more function parameters. A parameter list may include additional specifications for each parameter, such as the parameter's type, whether the parameter is optional, a default value if the parameter is optional, or a default value for a newly added parameter. The term "argument" refers to a piece of data or a reference that is provided to the function. A function call may include zero or more arguments in an argument list. A function call is referred to as a "call site." In formal computer science language, the terms "formal parameter" and "actual parameter" correspond to "parameter" and "argument," respectively, as used herein.

As used herein, the term "sorting" refers to an action of rearranging a list of elements to be in a specified order. There are various ways of sorting a list of elements, some of which sort the elements "in place" and some which create a modified copy of the original list. As a result of sorting, one or more elements of the sorted list have a different index value than the original list. Some techniques of sorting may recognize that some elements do not require a change; however, as used herein, the entire list is considered to be sorted. For example, changing the list A, B, C, E, D to be in alphabetical order A, B, C, D, E may be considered to be a sort of the entire list. A list of elements may be sorted to match corresponding elements in a second list.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of a computer system 100 in which mechanisms described herein may be implemented. FIG. 1 is only an example of a suitable system configuration and is not intended to suggest any limitation as to the scope of use or functionality of the present invention. Thus, a variety of system configurations may be employed without departing from the scope or spirit of the present invention.

As illustrated, system 100 includes program source code 102, which may be a high level language representation of a computer program. Examples of a high level language include C-Sharp (C#), C++, Visual Basic, F-Sharp (F#), or various other high level languages. LINQ, which is a combination of a language and a library extension, is another example of program source code 102. Program source code 102 is a representation of a target program that may be edited and executed by system 100. A target program may include one or more functions. A target program may reside in one or more files or other storage representations. A target program may include one or more libraries, which may be integrated or distributed in a variety of ways. Thus, program source code 102 may represent a program library or a portion thereof.

As illustrated, system 100 includes integrated development environment (IDE) 108. IDE 108 may include a variety of tools that assist a programmer to develop software. In the illustrated embodiment, IDE includes editor 110, refactoring engine 112, and parser 114. In some configurations, IDE 108 may include a debugger, class browser, or other development tools. Visual Studio®, by Microsoft Corporation, is an example of an IDE that may implement at least some of the mechanisms described herein.

Editor 110 may be a software component that enables a user to view, write, or modify source code. Editor 110 may include a user interface component that displays source code 102 and receives input text and commands from a user. Editor 110 may include a number of features that provide information relating to a computer program or portion thereof, facilitate editing functions, or the like. In some embodiments, editor 110 may include features that indicate syntactical or semantic errors, suggest corrections, or facilitate entering correct program code. In various configurations, functions of editor 110 may be distributed across multiple components or combined with other components of system 100, including those not illustrated.

In the illustrated embodiment, refactoring engine 112 may receive signatures 116 from editor 110. Signatures 116 may include an original function signature and a revised signature. The format for specifying these signatures may vary with different implementations. In one embodiment, each signature may be in the form of a source code statement, or portion thereof, as specified by the programming language in use. In one embodiment, the revised signature may be represented by data indicating modifications to the original signature, such that a revised parameter list, or at least the data relevant to the mechanisms herein described, may be constructed.

As illustrated, in one embodiment, refactoring engine 112 may receive call sites 117, which includes one or more call sites corresponding to signatures 116. Call sites that are input to refactoring engine 112 are referred to as "original" call sites. The format and mechanism for specifying the call sites may vary with different implementations. In one embodiment, each call site may be in the form of a source code statement, or portion thereof, as specified by the programming language in use. In one embodiment, an argument list may be extracted from each call site and provided to refactoring engine 112. In one embodiment, program source code 102 may be provided to refactoring engine 112; refactoring engine 112 may employ parser 114 to analyze the source code, locate each call site corresponding to signatures 116, or identify each argument in an argument list.

In accordance with mechanisms described herein, refactoring engine may transform one or more original call sites to produce refactored call sites 118, which may be passed to editor 110. Editor 110 may update the original call sites with the refactored call sites. In some embodiments, editor 110 may perform additional actions, such as providing a preview of each call site or argument list to a user, and selectively updating each original call site based on a user selection or command.

In the illustrated embodiment, system 100 includes compiler 120, which translates program source code 102 into native code 122. Though compiler 120 is illustrated as a single component, in various embodiments, it may include one or more subcomponents, and may generate one or more intermediate representations of a computer program. For example, in one embodiment, compiler 120 may include a front end that generates an intermediate language representation, and a code generator that translates the intermediate language representation into native code 122. In one configuration, the system may use just-in-time (JIT) compilation. Generally, a JIT compiler employs a mechanism in which an intermediate language representation of a program function is loaded and translated into a native language representation in response to its first invocation.

Native code 122 may be a machine language, a virtual machine language, or another representation that may be executed by a physical or virtual processor. Processor 124 may receive native code 122 and execute program instructions, to produce execution results 126. In one configuration, processor 124 may include one or more central processing units, one or more processor cores, an ASIC, or other hardware processing component and related program logic. In one configuration, processor 124 may include a software component simulating a hardware processing unit. Processor 124 executes instructions in the native code 122. As used herein, the term "runtime" refers to the execution of target program instructions, or libraries, assemblies, or executable files that interact with the target program.

Execution results 126 is a logical representation of the results of executing the native code 122. The results may include one or more of modifications to computer storage or computer memory, communication with other processes or computing devices, audio or video output, or control of various system or external components.

An example of a use of the refactoring feature may be that of a programmer who modifies a function signature, for any of a variety of reasons. A programmer may desire to enhance the operation of a function, improve the program code, simplify a function, or revise the signature for another reason. The programmer may invoke a refactoring feature to assist in transforming each call site based on the signature changes. Upon previewing refactored call sites 118, the programmer may command the editor to update one or more of the call sites or reject them. The programmer may decide to manually update one or more call sites rather than accept the proposed transformations.

System 100 may be a subsystem of a development system. A development system may include one or more computing devices that are used by a program developer or a user as part of a program development, testing, or documentation process. The components of system 100 may be distributed among one or more computing devices, each of which may communicate with the others by employing one or more of various wired or wireless communication protocols such as IP, TCP/IP, UDP, HTTP, SSL, TLS, FTP, SMTP, WAP, Bluetooth, WLAN, or the like.

Figure 9:
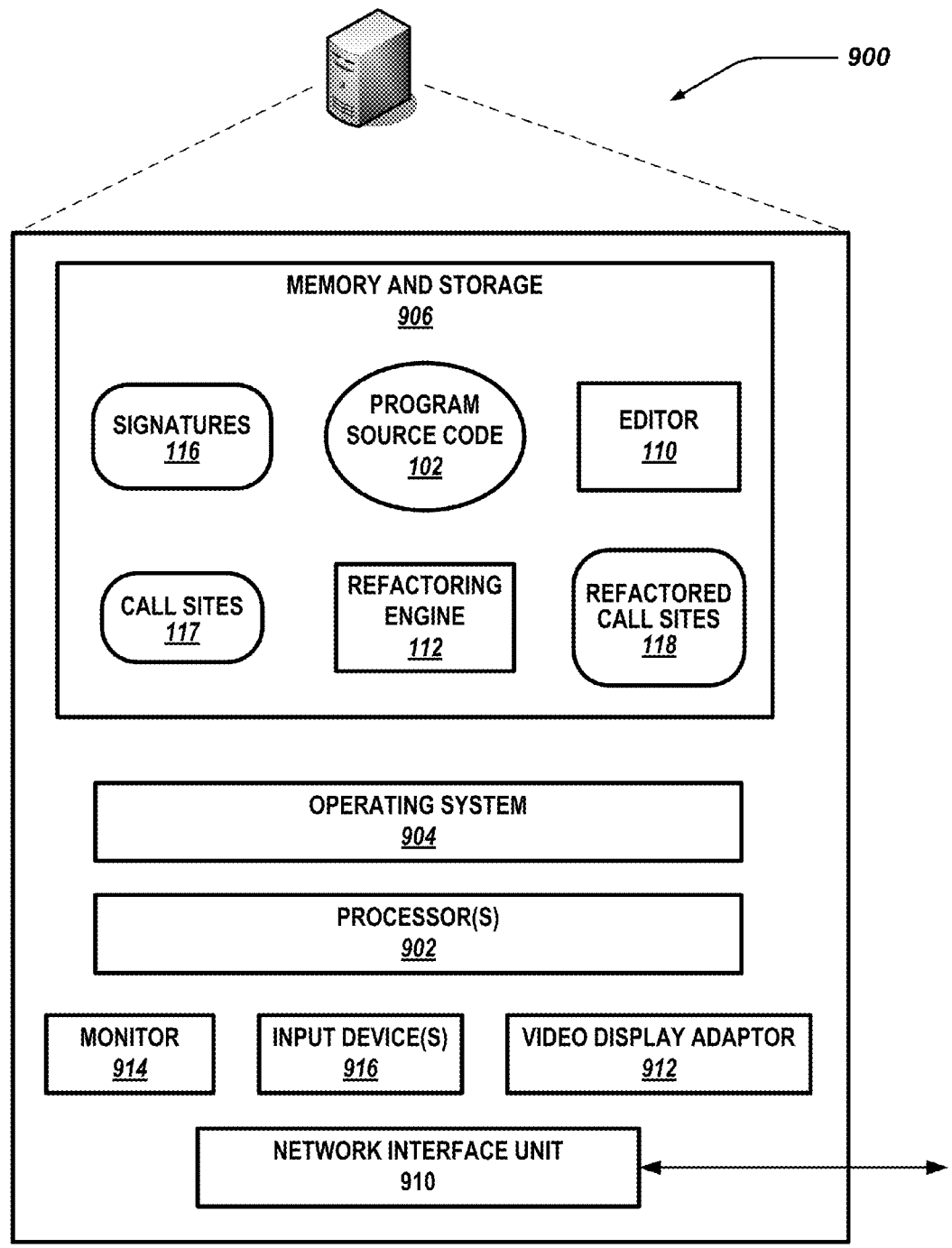
FIG. 9 shows one embodiment of a computing device, illustrating selected components of a computing device that may be used to perform functions described herein.

A computing device may be a special purpose or general purpose computing device. Example computing devices include mainframes, servers, blade servers, personal computers, portable computers, communication devices, consumer electronics, or the like. FIG. 9 illustrates an example embodiment of a computing device that may be used to implement system 100.

Figure 2:
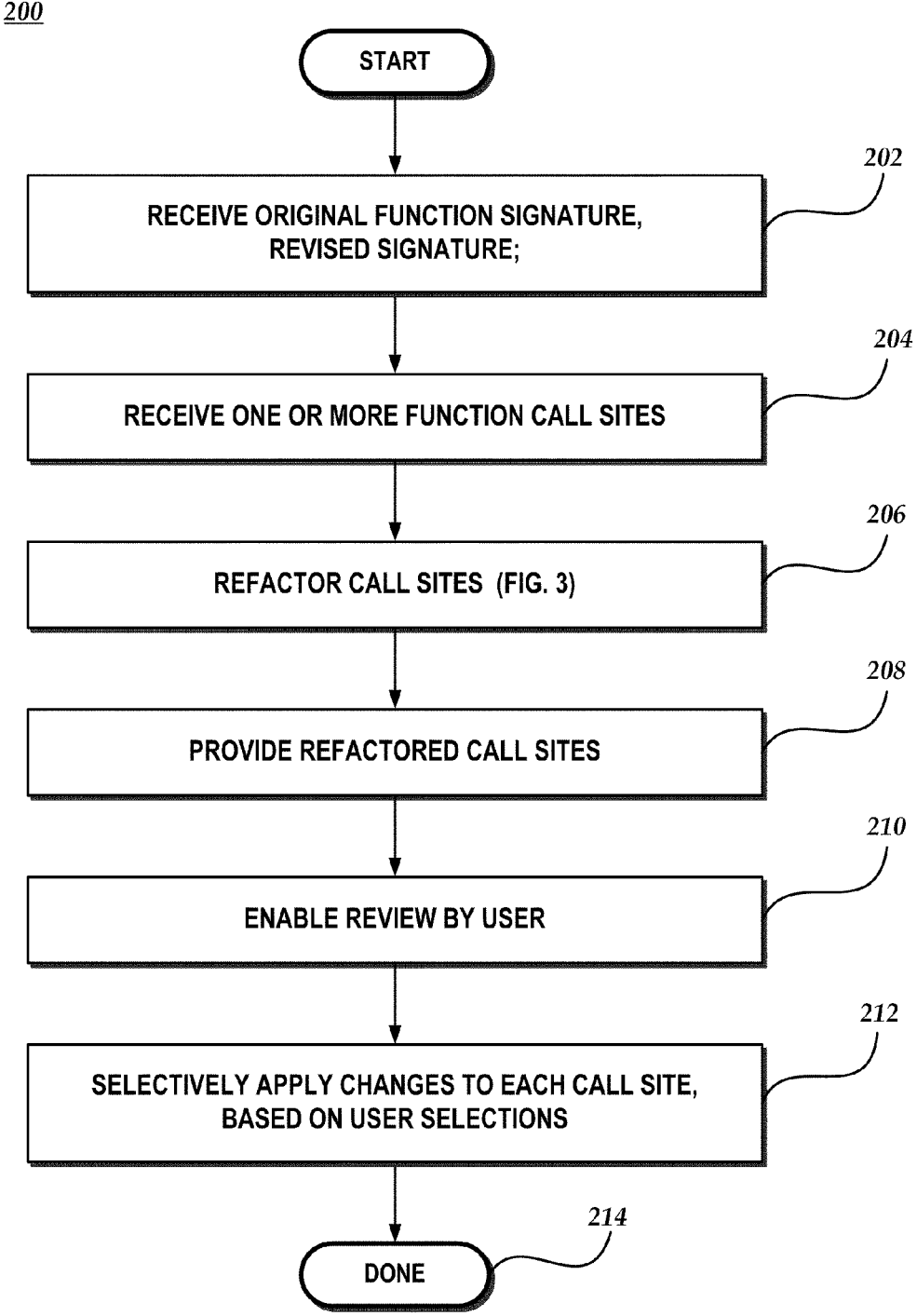
FIG. 2 is a flow diagram illustrating an example embodiment of a process for modifying call sites corresponding to signature changes.

FIG. 2 is a flow diagram illustrating an example embodiment of a process 200 for modifying call sites corresponding to signature changes. In one embodiment, some of the actions of process 200 are performed by components of computer system 100 of FIG. 1.

The illustrated portions of process 200 may be initiated at block 202, where an original signature and a revised signature may be received. In one embodiment, refactoring engine 112 may receive signatures 116 from editor 110, as illustrated in FIG. 1.

The process may flow to block 204, where one or more call sites corresponding to the signatures are received. In one embodiment, refactoring engine 112 or another component may parse program source code 102 to locate and extract each call site.

Figure 3:
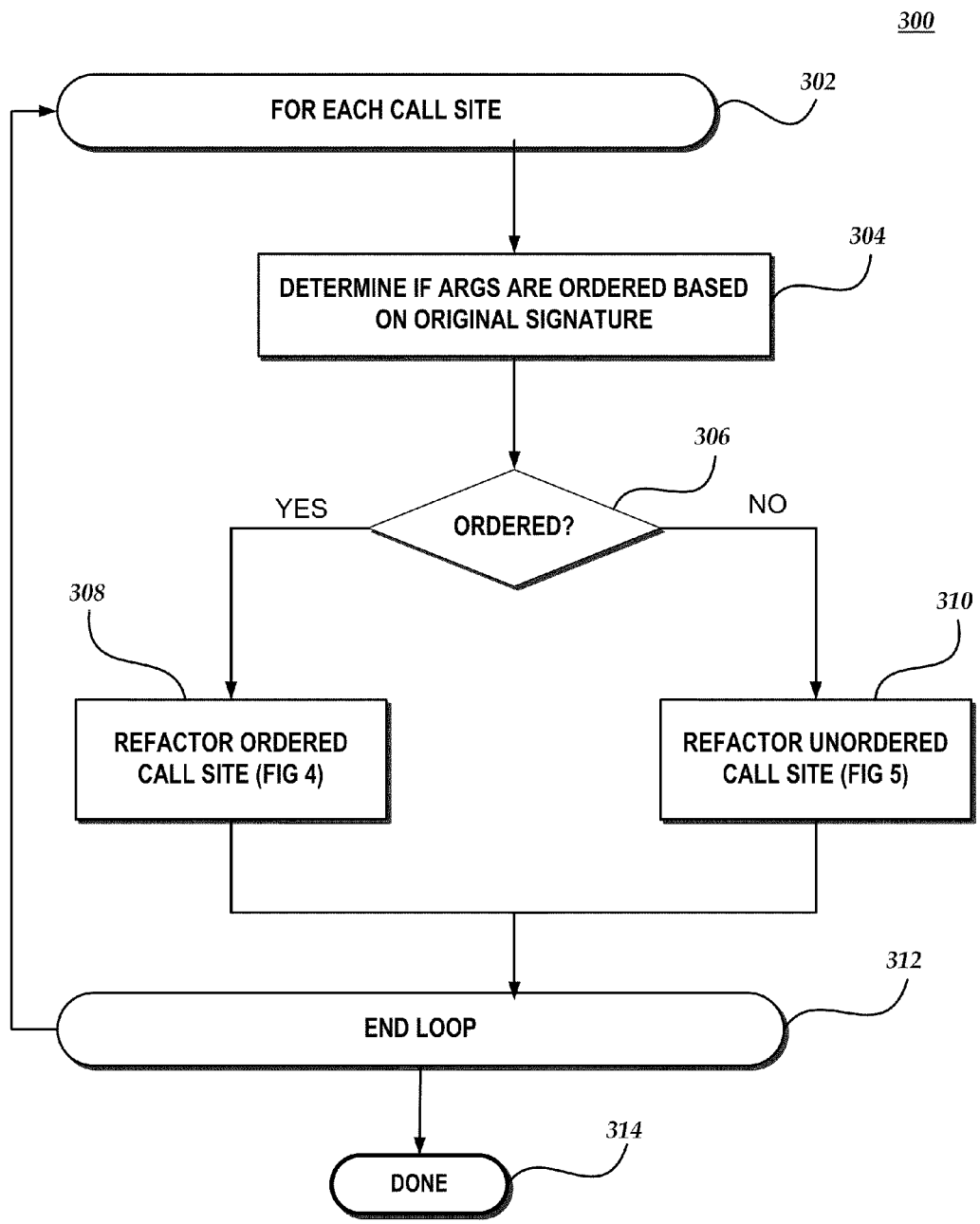
FIG. 3 is a flow diagram illustrating, in further detail, some of the actions of the process described by FIG. 8.

The process may flow to block 206, where one or more of the received call sites may be refactored, in accordance with at least some of the mechanisms described herein. FIG. 3 illustrates an example embodiment of a process for refactoring call sites, and may therefore be included within block 206.

The process may flow to block 208, where one or more refactored call sites may be provided. For example, refactoring engine 112 may provide refactored call sites 118 to editor 110, though in some implementations another component may receive and process the refactored call sites.

The process may flow to block 210, where a review of the refactored call sites by a user may be enabled. A review may provide various mechanisms for accepting, rejecting, or modifying each refactored call site. The process may flow to block 212, where each refactored call site may be selectively applied, based on the user selections. Applying the changes may include modifying program source code 102, a copy thereof, or another data structure or file that stores call sites data. The process may flow to done block 214, and exit or return to a calling program, such as an editing module of editor 110.

In one configuration, the actions of blocks 210 and 212 may be performed by editor 110, and the actions of blocks 202-208 may be performed by refactoring engine 112. However, in various implementations, the actions of process 200 may be distributed differently among editor 110, refactoring engine 112, or other components of system 100, including those that may not be illustrated in FIG. 1.

Though the actions of process 200 are presented in discrete blocks, in various implementations they may be combined in various orders or intermixed in a variety of ways, including actions that are performed concurrently by one or more threads. Thus, FIG. 2 provides a description of an example embodiment, but implementations may vary.

FIG. 3 is a flow diagram illustrating an example embodiment of a process 300 for revising call sites corresponding to a signature change. Process 300, or a variation thereof, may perform at least some of the actions of block 206, of FIG. 2. Process 300 may be initiated at loop 302, which iterates for each call site corresponding to a specified signature change. In the illustrated embodiment, loop 302 includes blocks 304-310, and is terminated by block 312. Within each iteration of loop 302, a call site being processed is referred to as the "current call site."

Figure 6:
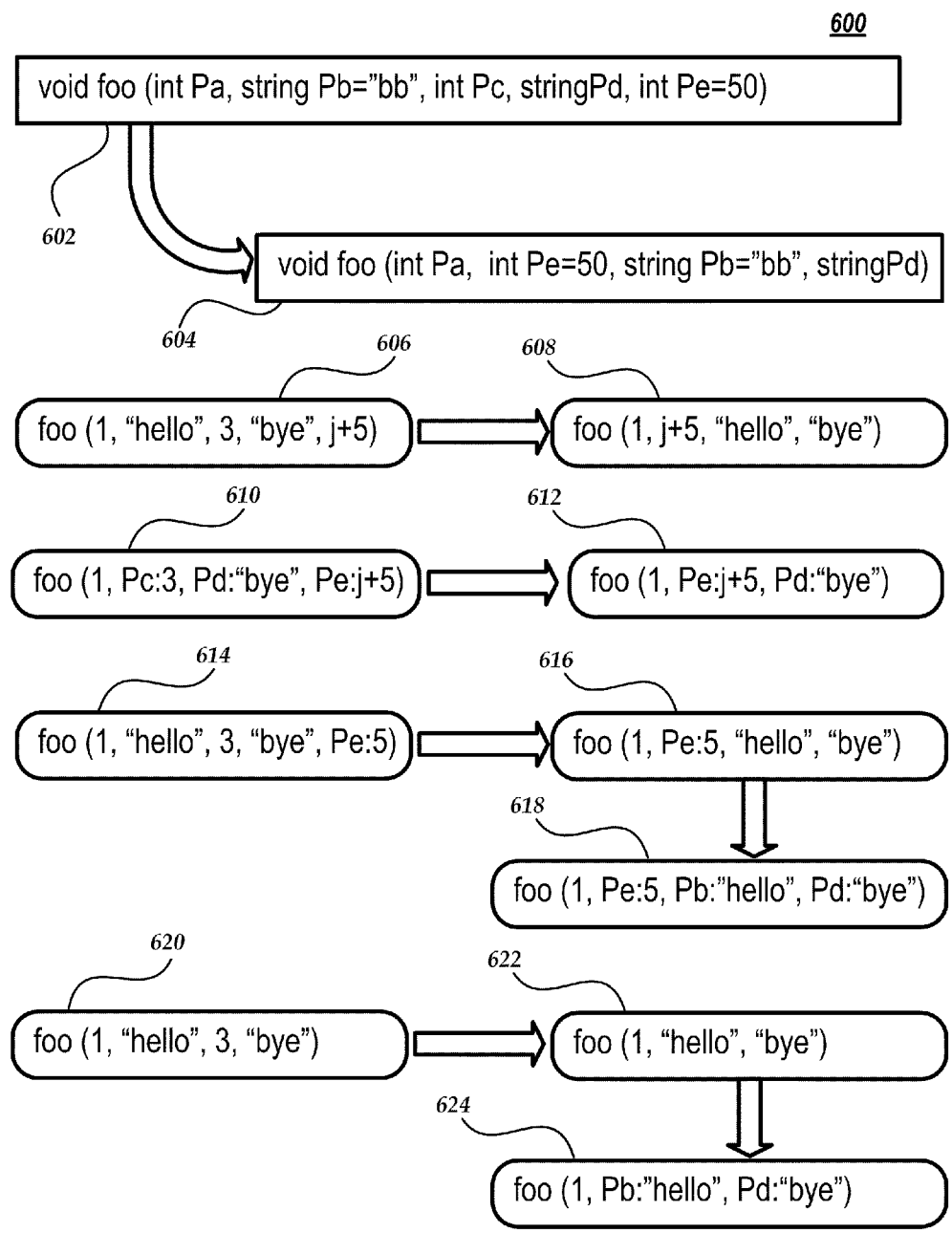
FIG. 6 illustrates source code that includes examples of transformations that may be made to an ordered argument list by the mechanisms described herein.
Figure 7:
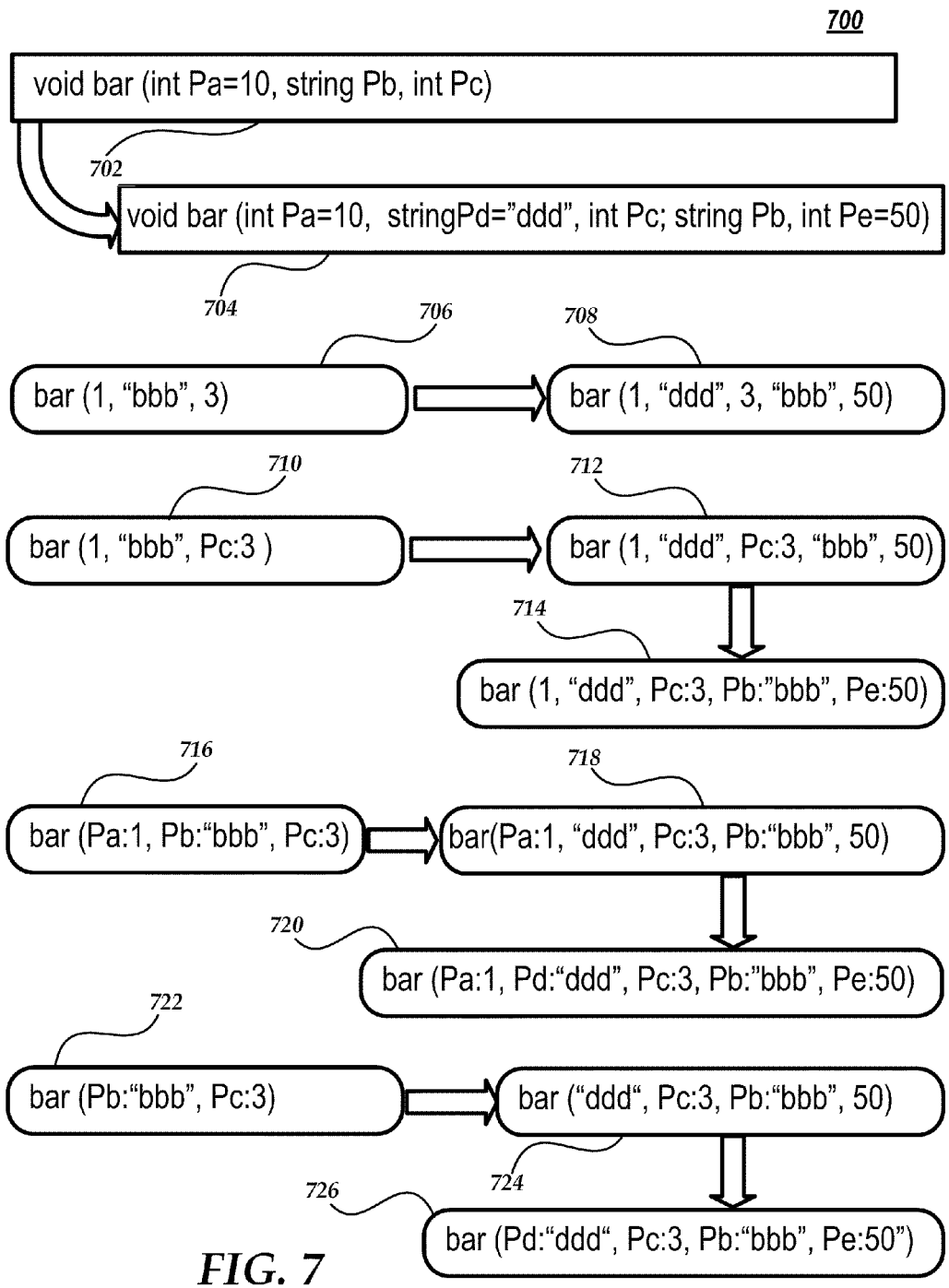
FIG. 7 illustrates source code that includes additional examples of transformations that may be made to an ordered argument list by the mechanisms described herein.

At block 304, a determination may be made of whether the argument list of the current call site is ordered, based on the original signature. In one implementation, a call site may be considered ordered if all of the arguments in its argument list are in the same order as the corresponding parameters in the original signature parameter list, even though one or more arguments may be omitted. An ordered call site may, but does not necessarily, include one or more named arguments. If an argument list is ordered and does not include any named arguments, then each of its arguments is matched to its corresponding parameter by position. For example, the third argument corresponds to the third parameter in the parameter list. FIG. 6 includes examples of argument lists that are ordered. FIG. 7 includes examples of argument lists that are not ordered.

Figure 4:
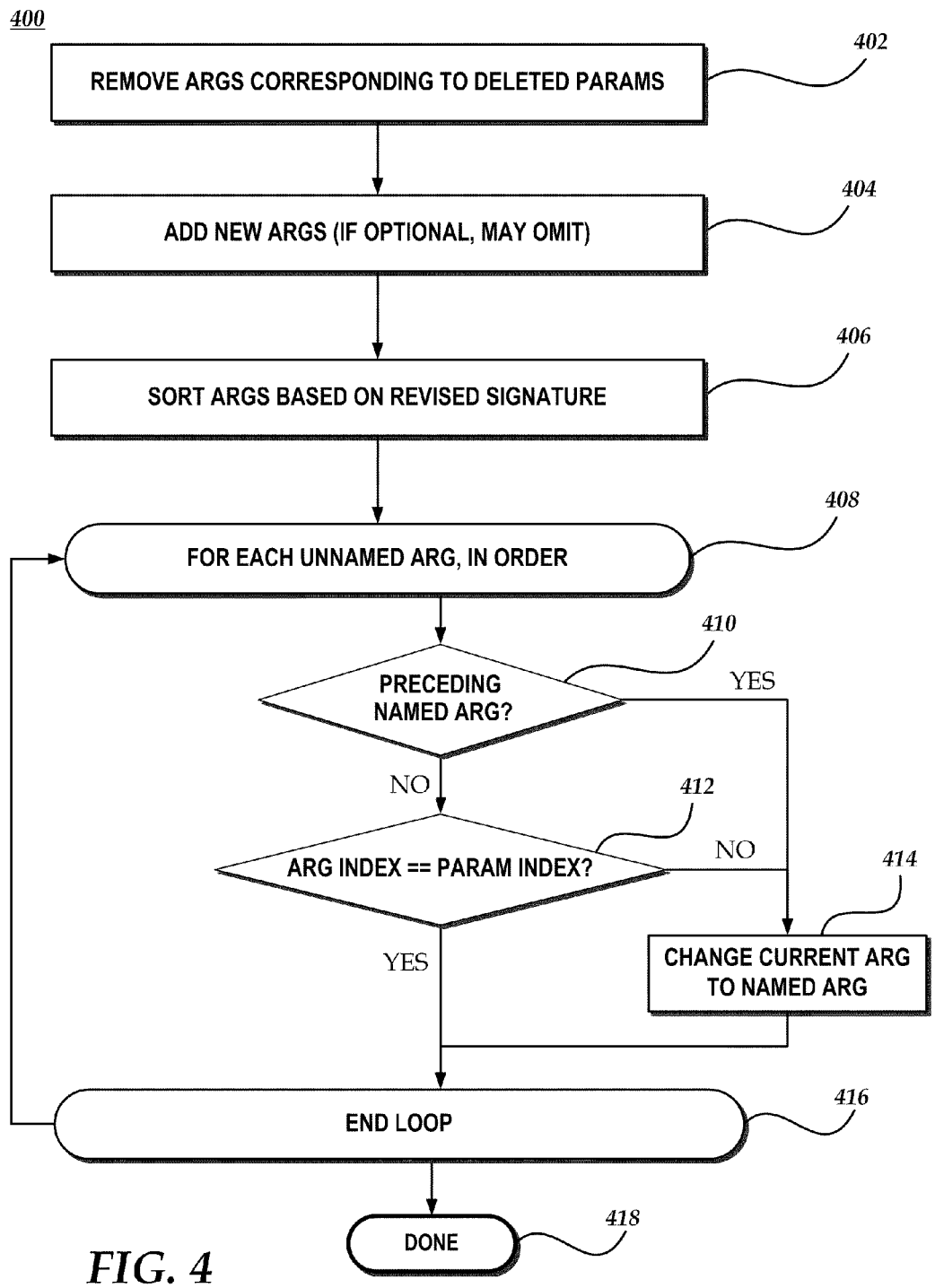
FIG. 4 is a flow diagram illustrating an example embodiment of a process for refactoring an ordered call site.

The process may flow to decision block 306, where a flow decision is made based on the determination of block 304. If it is determined that the argument list is ordered, the process may flow to block 308, where the call site is refactored. FIG. 4 illustrates an example embodiment of a process for refactoring an ordered call site. The process may flow to end loop block 312, and selectively perform another iteration of loop 302, based on whether there is at least one call site remaining to be processed. Upon exiting loop 302, the process may flow to done block 314, and exit or return to a calling program, such as process 200.

Figure 5:
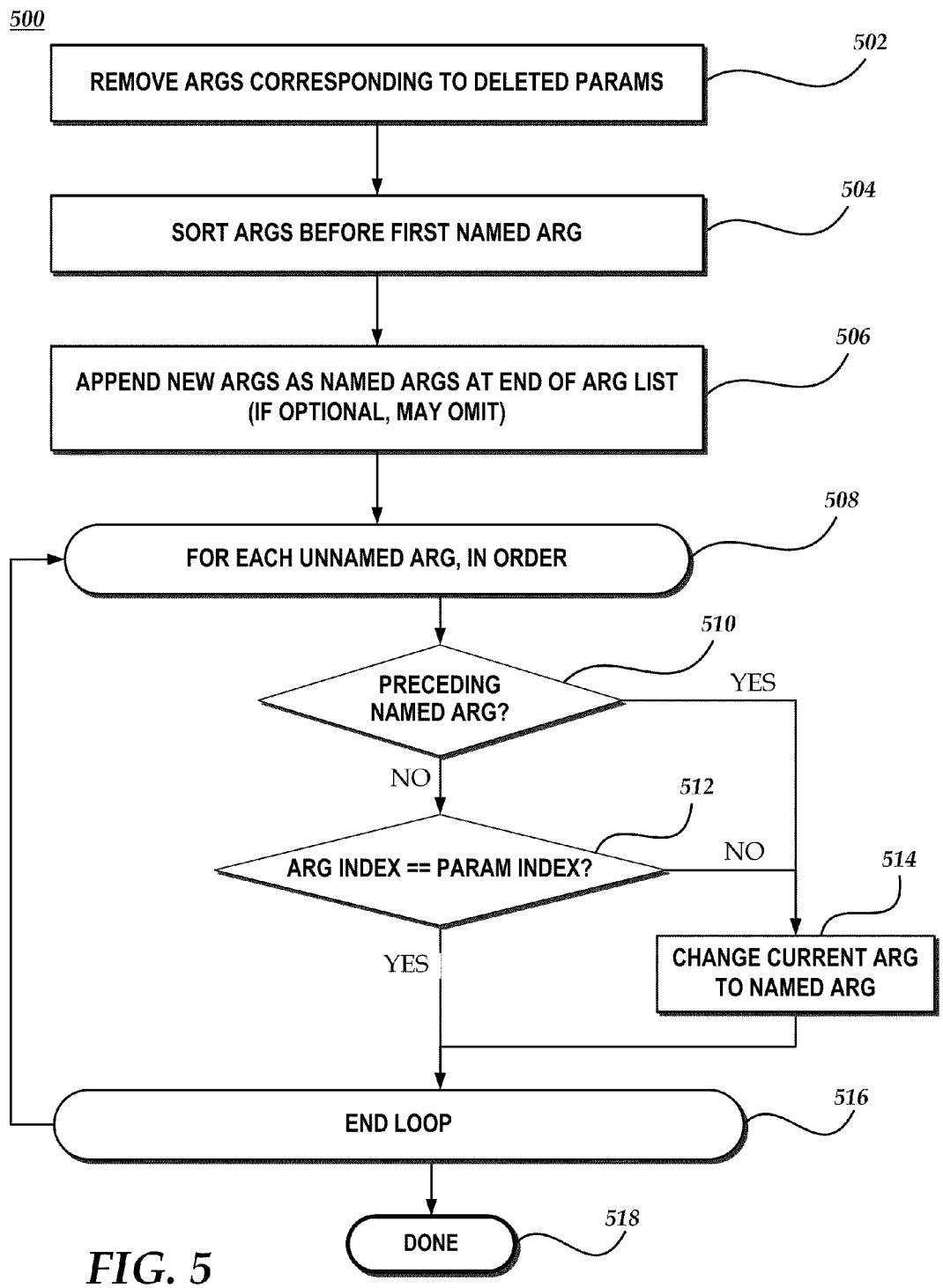
FIG. 5 is a flow diagram illustrating an example embodiment of a process for refactoring an unordered call site.

If, at decision block 306, it is determined that the current call site is unordered, the process may flow to block 310, where the call site is refactored. FIG. 5 illustrates an example embodiment of a process for refactoring an unordered call site. The process may flow to end loop block 312, and continue as described above.

FIG. 4 is a flow diagram illustrating an example embodiment of a process 400 for refactoring an ordered call site. Process 400, or a variation thereof, may perform at least some of the actions of block 308, of FIG. 3. In the discussion that follows, references are made to FIGS. 6 and 7, which provide examples of results that may be obtained by performing at least portions of process 400. FIG. 6 illustrates an example set 600, including an example original signature 602 and revised signature 604. It also includes example original call sites 606, 610, 614, and 620, each having one or more corresponding refactored call sites.

Process 400 may be initiated at block 402, where arguments corresponding to deleted parameters are removed from the argument list. The process may flow to block 404, where new arguments, corresponding to newly added parameters, may be added to the argument list. In one embodiment, an argument corresponding to a newly added optional parameter may be omitted from this action. In one embodiment, a system may be configured by a user to indicate whether to include or omit new arguments during process 400.

The process may flow to block 406, where the arguments in the argument list are sorted to match the ordering of the parameter list in the revised signature. This action may include actions such as matching each original argument that survived the removal of block 402 with its corresponding parameter, matching each newly added argument with its corresponding parameter, iterating over each parameter in the revised signature in order, and appending the corresponding argument, if it exists, into a modified argument list. Optional arguments that were absent in the original argument list may be excluded from this action. The result may be an ordered argument list that matches the ordering of the revised parameter list, though one or more optional arguments may be omitted.

In FIG. 6, revised signature 604 indicates that parameter Pc has been deleted from original signature 602. There are no newly added parameters. Modified call site 608 illustrates a result of the actions of blocks 402, 404, and 406 on original call site 606. Similarly original call sites 610, 614, and 620 may be transformed into modified call sites 612, 616, and 622, respectively, by deleting the argument corresponding to parameter Pc and sorting the remaining arguments to match the parameter order of revised signature 604. It is to be noted that original call site 610 has omitted the optional argument corresponding to optional parameter Pb; original call site 620 has omitted the optional argument corresponding to optional parameter Pe. In some configurations, each of these optional arguments may be included in a modified call site.

Original call sites 606 and 620 include an argument list in which all arguments are bound to their corresponding parameters by position. Original call sites 610 and 614 include one or more arguments that are bound by position and one or more arguments that are bound to their corresponding parameters by name. However, all of the original example call sites in FIG. 600 are ordered, and all remain ordered after sorting.

Returning to FIG. 4, process 400 may flow from block 406 to loop 408, which iterates for each unnamed argument, in order beginning with the first argument. In the illustrated embodiment, loop 408 includes blocks 410-414, and is terminated by block 416. Within each iteration of loop 408, an argument being processed is referred to as the "current argument."

At decision block 410, a determination is made of whether a named argument precedes the current argument in order, in the current argument list. Though the determination is found to be affirmative if any named argument precedes the current argument, the logic of process 400 allows a determination of whether the immediately preceding argument is named to suffice. In one implementation, during the first iteration of loop 408 in which a named argument is found, a flag may be set that indicates all succeeding arguments are to be determined as having a preceding named argument.

If, at decision block 410, it is determined that at least one named argument precedes the current argument, the process may flow to block 414, where the current argument is modified to be a named argument. In one configuration, this may include inserting the name of the parameter that corresponds to the current argument. In FIG. 6, original call site 614 is first changed to modified call site 616 as described above. The actions of loop 408 and multiple applications of block 414 result in modified call site 618, where the argument "hello," corresponding to parameter Pb, and the argument "bye," corresponding to parameter Pd, have been changed to be named arguments.

The determination of decision block 410 and the actions of block 414 apply the syntax of some languages, such as C#, in which arguments that follow a named argument must be named arguments. However, in a configuration in which such a language requirement is not present, or the system is configured to not enforce the language requirement, the actions of decision block 410 may be omitted, allowing an unnamed argument to follow a named argument.

The process may flow from block 414 to block 416, and selectively perform another iteration of loop 408, based on whether there are unnamed arguments remaining to be processed. Upon exiting loop 408, the process may flow to done block 418, and exit or return to a calling program, such as process 300.

If, at decision block 410, it is determined that no named arguments precede the current argument, the process may flow to decision block 412, where a determination is made of whether the index of the current argument in the argument list is equivalent to the index of the corresponding parameter in the parameter list of the revised signature. If an equivalent match is not found, the process may flow to block 414, where the current argument is modified to be a named argument. The process may flow to block 416, and continue as described above. If, at decision block 412, it is determined that the argument index and the corresponding parameter index are equivalent, the process may flow to block 416, and continue as described above.

In the description of FIG. 4, reference is made to modifying or changing arguments, or to leaving arguments unchanged or unmodified. In some embodiments, a modification of an argument list may include generating a modified copy of the argument list. An argument that is not modified may be copied into the modified copy. This is referred to as maintaining the argument in its existing form. In one embodiment, each named argument is maintained as a named argument. Modifying an argument may be implemented by generated a modified copy of the argument in the modified argument list. It is to be understood that modifying an argument does not necessarily include modifying the original argument list. This terminology is applicable to the various processes or actions throughout herein.

In modified call site 608, the indices of the arguments, in order, are 1, 2, 3, and 4. The corresponding parameter in the revised parameter list, Pa, Pe, Pb, and Pd, respectively, have indices of 1, 2, 3, and 4. Therefore, when processing modified call site 608, a match of the argument index and parameter index is found for each argument, and process 400 flows from decision block 412 to block 416 for each iteration.

In modified call site 622, argument 1 has an index of one and matches the index of the corresponding parameter Pa. Argument "hello" has an index of two, but does not match the index of the corresponding parameter Pb, which has an index of three. Therefore, when argument "hello" is the current argument, decision block 412 determines a non-match, the process may flow to block 414, and argument "hello" is changed to be a named argument. In the next iteration of loop 408, in which the argument "bye" is the current argument, decision block 410 may determine that a named argument (the modified argument Pb:"hello") precedes the current argument, causing block 414 to change the argument "bye" to a named argument Pd:"bye". It is to be noted that, in an embodiment in which decision block 410 is not applied, or in which decision block 412 precedes decision block 410 in the process, process 400 may determine that the index of the argument "bye" does not match its corresponding parameter index, and change it to a named argument for this reason.

The examples of FIG. 6 illustrate an example signature change that does not include a newly added parameter. FIG. 7 illustrates an example set 700, including an original signature 702 and revised signature 704. Revised signature 704 includes two new parameters, Pd and Pe. Also, the positions of the parameters Pb and Pc are reversed from the original signature 702.

In FIG. 7, example original call sites 706, 710, 716, and 722 are each ordered and have one or more corresponding modified call sites. Call site 706 includes three arguments that are bound to their corresponding parameters by position. Modified call site 708 illustrates a result of performing process 400 to modify call site 706. As illustrated, arguments "ddd" and 50 are added, corresponding to new parameters Pd and Pe, respectively, and each having the default value specified in revised signature 704. Modified call site 708 illustrates changes that may be made as a result of performing actions of blocks 404 and 406. In the illustrated example, there are no unnamed arguments that have a preceding named argument, and no unnamed arguments that have an index value not matching the corresponding parameter index. Therefore, no additional changes occur as a result of performing loop 408.

Modified call site 712 illustrates changes made to call site 710 as a result of performing actions of blocks 404 and 406. In the iteration of loop 408 in which the argument "ddd" is the current argument, no changes are made. In the iteration of loop 408 in which the argument "bbb" is the current argument, a preceding named argument is found, and therefore at block 414 the argument "bbb" is changed to a named argument, Pb:"bbb." Similarly, the newly added argument 50 is changed to a named argument, Pe:50, as shown in modified call site 714. As illustrated in FIG. 4, in one implementation, loop 408 iterates for each unnamed argument. Thus, arguments that are already named may be excluded from processing by the determinations of decision blocks 410 and 412.

Modified call site 718 illustrates changes made to call site 716 as a result of performing actions of blocks 404 and 406. In this example, the first argument, Pa:1, is named. Therefore, processing loop 408 causes each succeeding unnamed argument, specifically the newly added arguments "ddd" and 50, to be changed to a named argument, as shown in modified call site 720.

Original call site 722 shows an example in which an optional argument, corresponding to the parameter Pa, is omitted. Some programming languages require that optional parameters be located after required parameters in a parameter list. Some programming languages, such as C#, allow optional parameters to precede required parameters. Original signature 702, revised signature 704, and original call site 722 provide an example in which an optional parameter precedes a required parameter. After inserting new arguments and sorting, there are four arguments, as shown in modified call site 724. In this example, the newly added argument "ddd" is the current argument in the first iteration of loop 408, and decision block 412 may determine that the argument index (1) does not match the corresponding parameter index (2). Therefore, at block 414, the argument is changed to a named argument, Pd:"ddd". Each succeeding unnamed argument, specifically the newly added argument 50 may be found to follow a named argument, and may also be changed to a named argument, as shown in modified call site 726.

Figure 8:
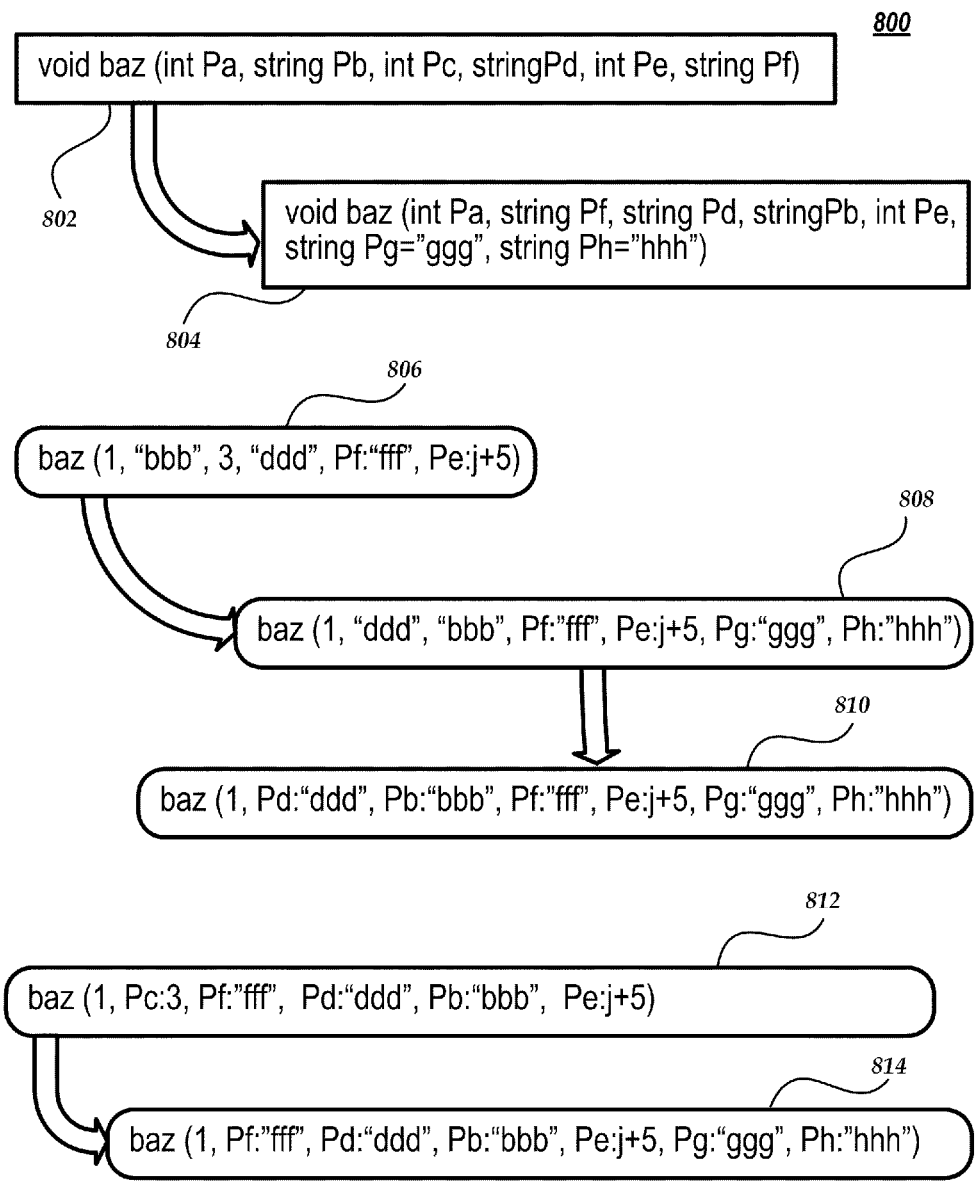
FIG. 8 illustrates source code that includes additional examples of transformations that may be made to an unordered argument list by the mechanisms described herein.

FIG. 5 is a flow diagram illustrating an example embodiment of a process 500 for refactoring an unordered call site. Process 500, or a variation thereof, may perform at least some of the actions of block 310, of FIG. 3. In the discussion that follows, references are made to FIG. 8, which provides examples of results that may be obtained by performing at least portions of process 500. FIG. 8 illustrates an example set 800, including an original signature 802 and revised signature 804. It also includes example original call sites 806 and 812, each having one or more corresponding modified call sites.

Process 500 may be initiated at block 502, where arguments corresponding to deleted parameters are removed from the argument list. The process may flow to block 504, where a proper subset of the arguments in the original argument list may be sorted. More specifically, in one embodiment, the arguments in the original argument list that come before the first named argument are sorted to match the ordering of the parameter list in the revised signature. During processing of the example original call site 806, the third argument, 3, is removed from the argument list. This leaves three arguments, 1, "bbb," and "ddd" that come before the first named argument, Pf:"fff." These three arguments are sorted to match the ordering of their corresponding parameters, Pa, Pb, and Pd, respectively, as they appear in revised signature 804. Thus, modified call site 808 contains these three arguments in the order 1, "ddd," and "bbb."

The process may flow to block 506, where arguments corresponding to newly added parameters are appended to the end of the argument list as named arguments. In the example modified call site 808, the arguments Pg:"ggg" and Ph:"hhh" are appended to the argument list. These arguments derive their values from the default values specified in revised signature 804. As noted at block 404, arguments corresponding to newly added optional parameters may be omitted from a modified call site in some configurations.

Process 500 may flow from block 506 to loop 508, which iterates for each unnamed argument, in order beginning with the first argument. In one embodiment, the actions and flow of loop 508 are substantially similar to that of loop 408 of FIG. 4, and the description of loop 408 provided herein applies to loop 508. The description of loop 408 and blocks 410, 412, 414, and 416 apply to loop 508, 510, 512, 514, and 516, respectively. In summary, each unnamed argument is changed to a named argument if a preceding argument is named or if the argument index does not match the corresponding parameter index.

In modified call site 808, argument 1 has an index of one and matches the index of the corresponding parameter Pa. Argument "ddd" has an index of two, but does not match the index of the corresponding parameter Pd, which has an index of three in the revised signature. Therefore, when argument "ddd" is the current argument, decision block 512 determines a non-match, the process may flow to block 514, and argument "ddd" is changed to a named argument. In the next iteration of loop 508, in which the argument "bbb" is the current argument, decision block 510 may determine that a named argument (the modified argument Pd:"ddd") precedes the current argument, causing block 514 to change the argument to a named argument Pb:"bbb". As discussed for process 400, in some embodiments, decision block 512 may be reached and determine that the index of the argument "bbb" does not match its corresponding parameter index, resulting in a change to a named argument for this reason.

In the example of original call site 812, after removing the argument Pc:3 corresponding to deleted parameter Pc, and appending the two new arguments, only the first argument remains as an unnamed argument. It remains unnamed after an iteration of loop 508. It is to be noted that in this example, the argument list of modified call site 814 is ordered with respect to revised signature 804, and each argument index matches the corresponding parameter index. However, the illustrated embodiment of process 500 does not change any of the named arguments to unnamed arguments; arguments bound by name remain bound by name and are not changed to binding by position, even when that is possible. Various embodiments may adhere to different policies with respect to handling of existing named arguments, placement of new arguments, or other actions described herein.

FIG. 9 shows one embodiment of a computing device 900, illustrating selected components of a computing device that may be used to implement system 100 or perform functions described herein, including processes 200, 300, 400, or 500. Computing device 900 may include many more components than those shown, or may include less than all of those illustrated. Computing device 900 may be a standalone computing device or part of an integrated system, such as a blade in a chassis with one or more blades.

As illustrated, computing device 900 includes one or more processors 902, which perform actions to execute instructions of various computer programs. In one configuration, each processor 902 may include one or more central processing units, one or more processor cores, one or more ASICs, cache memory, or other hardware processing components and related program logic. As illustrated, computing device 900 includes an operating system 904. Operating system 904 may be a general purpose or special purpose operating system. The Windows® family of operating systems, by Microsoft Corporation, of Redmond, Wash., are examples of operating systems that may execute on computing device 900.

Memory and storage 906 may include one or more of a variety of types of non-transitory computer storage media, including volatile or non-volatile memory, RAM, ROM, solid-state memory, disk drives, optical storage, or any other medium that can be used to store digital information.

Memory and storage 906 may store one or more components described herein or other components. In one embodiment, memory and storage 906 stores the software components of system 100, or a portion thereof. The illustrated example components are program source code 102, editor 110, refactoring engine 112, signatures 116, call sites 117, and refactored call sites 118, though more or less components may be stored in memory and storage 906. Any one or more of these components may be moved to different locations in RAM, non-volatile memory, or between RAM and non-volatile memory by operating system 904 or other components.

Computing device 900 may include a video display adapter 912 that facilitates display of program code or other information to a user. Though not illustrated in FIG. 9, computing device 900 may include a basic input/output system (BIOS), and associated components. Computing device 900 may also include a network interface unit 910 for communicating with a network. Software components of system 100 may be received via transitory media and network interface unit 910. Computing device 900 may include one or more display monitors 914. Embodiments of computing device 900 may include one or more input devices 916, such as a keyboard, pointing device, audio component, microphone, voice recognition component, or other input/output mechanisms.

It will be understood that each block of the flowchart illustration of FIGS. 2-5, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based method of modifying a call site having an argument list with at least one argument, based on a first signature having a first parameter list with at least one parameter and a second parameter list with a second parameter list, the method comprising:
    a) selectively sorting at least a portion of the argument list based on the second parameter list; and
    b) for each argument of the argument list, performing actions including:
        i. if the argument is unnamed, selectively modifying the argument to be a named argument; and
        ii. if the argument is named, maintaining the argument as named.

2. The computer-based method of claim 1, selectively sorting comprising sorting arguments that do not have a named argument preceding them in the argument list.

3. The computer-based method of claim 1, selectively sorting comprising:
    a) if the argument list is ordered based on the first parameter list, reordering the argument list to match the second parameter list; and
    b) if the argument list is not ordered based on the first parameter list, reordering a portion of the argument list to match the second parameter list.

4. The computer-based method of claim 1, selectively modifying the argument comprising selectively modifying the argument based on whether the argument index matches an index of a corresponding parameter of the second parameter list.

5. The computer-based method of claim 1, selectively modifying the argument comprising selectively modifying the argument based on whether another argument preceding the argument is named.

6. The computer-based method of claim 1, further comprising adding a new argument at a position in the argument list based on whether the argument list is ordered based on the first parameter list.

7. The computer-based method of claim 1, further comprising determining whether a new argument is to be named based on whether the argument list is ordered based on the first parameter list.

8. The computer-based method of claim 1, further comprising inserting a new argument in the argument list and determining whether the new argument is to be named based on one or more arguments that precede the new argument in the argument list.

9. The computer-based method of claim 1, the second parameter list includes an optional parameter that does not have a corresponding parameter in the first parameter list, the method further comprising omitting an argument corresponding to the optional parameter from the argument list.

10. A computer-based system for modifying a call site having an argument list with at least one argument, based on a first signature having a first parameter list and a second signature having a second parameter list, the system comprising:
    a) a refactoring engine configured to perform actions including:
        i. determining whether the argument list is ordered based on the argument list and the first parameter list;
        ii. if the argument list is ordered, sorting the argument list based on the second parameter list;
        iii. if the argument list is unordered, sorting a proper subset of the argument list, based on the ordering of the second parameter list;
        iv. selectively modifying each argument to be a named argument based on whether an index of the argument is equivalent to an index of a corresponding parameter in the second parameter list;
        v. selectively modifying each argument to be a named argument based on whether a preceding argument is named; and
        vi. selectively adding new arguments as named arguments based on whether the argument list is ordered; and
    b) at least one processor configured to execute program instructions that implement the refactoring engine.

11. The computer-based system of claim 10, the argument list including a first argument bound to a corresponding parameter of the first parameter list by position and a second argument bound to a corresponding parameter of the first parameter list by name.

12. The computer-based system of claim 11, the actions further comprising:
    a) if the argument list is ordered, generating a modified argument list with new arguments in a position corresponding to a position of the corresponding parameters in the second parameter list; and
    b) if the argument list is unordered, generating a modified argument list by appending new arguments to the argument list.

13. The computer-based system of claim 11, further comprising selecting the proper subset to be a subset of arguments preceding a first-ordered named argument.

14. The computer-based system of claim 11, selectively modifying each argument comprising selectively modifying the argument based on whether an optional argument is omitted from the argument list and based on an index of a parameter in the second parameter list corresponding to the optional argument.

15. A computer-readable hardware storage medium comprising computer program instructions for modifying an argument list having at least one argument, the program instructions executable by one or more processors to perform actions including:
    a) receiving a first parameter list and a revised parameter list;
    b) selectively sorting at least a portion of the argument list based on the revised parameter list; and
    c) selectively modifying each unnamed argument of the argument list to be a named argument, based on whether another named argument precedes the unnamed argument or whether an index of the unnamed argument matches an index of a corresponding parameter of the revised parameter list.

16. The computer-readable hardware storage medium of claim 15, the actions further comprising determining whether a new argument is to be named based on whether the argument list is ordered based on the first parameter list.

17. The computer-readable hardware storage medium of claim 15, the actions further comprising modifying each unnamed argument that follows an omitted argument to be a named argument.

18. The computer-readable hardware storage medium of claim 15, the first parameter list and the revised parameter list are included in a source code represented in C#, the actions further comprising if the argument list is ordered based on the first parameter list and omits an optional argument, generating a refactored argument list that is ordered based on the revised parameter list.

19. The computer-readable hardware storage medium of claim 15, the actions further comprising displaying a modified argument list to a user and selectively inserting the modified argument list into a program source code based on an input from the user.

20. The computer-readable hardware storage medium of claim 15, the revised parameter list including a new parameter and a specification of a corresponding default value, the actions further comprising adding a new argument having the corresponding default value.

* * * * *